United States Patent
Luo et al.

(10) Patent No.: US 12,382,252 B2
(45) Date of Patent: Aug. 5, 2025

(54) NETWORK SLICE MULTICAST METHOD AND APPARATUS

(71) Applicant: HUAWEI TECHNOLOGIES CO., LTD., Shenzhen (CN)

(72) Inventors: Haiyan Luo, Shenzhen (CN); Qufang Huang, Shenzhen (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 644 days.

(21) Appl. No.: 17/705,893

(22) Filed: Mar. 28, 2022

(65) Prior Publication Data

US 2022/0217509 A1    Jul. 7, 2022

Related U.S. Application Data

(63) Continuation of application No. PCT/CN2020/116795, filed on Sep. 22, 2020.

(30) Foreign Application Priority Data

Sep. 30, 2019   (CN) .......................... 201910945418.2

(51) Int. Cl.
   *H04W 4/06*     (2009.01)
   *H04L 12/18*    (2006.01)
   *H04W 72/30*    (2023.01)

(52) U.S. Cl.
   CPC ............. *H04W 4/06* (2013.01); *H04W 72/30* (2023.01); *H04L 12/189* (2013.01)

(58) Field of Classification Search
   CPC ....... H04W 4/06; H04W 72/30; H04W 76/11; H04W 76/40; H04W 72/23; H04L 12/189
   See application file for complete search history.

(56) References Cited

U.S. PATENT DOCUMENTS

| | | | |
|---|---|---|---|
| 10,405,239 B2 * | 9/2019 | Oohira | H04W 8/06 |
| 2018/0160398 A1 | 6/2018 | Park et al. | |
| 2019/0082326 A1 | 3/2019 | Mathison et al. | |
| 2019/0158985 A1* | 5/2019 | Dao | H04W 28/04 |
| 2019/0289528 A1 | 9/2019 | Lou et al. | |

(Continued)

FOREIGN PATENT DOCUMENTS

| | | |
|---|---|---|
| CN | 104469691 A | 3/2015 |
| CN | 106572516 A | 4/2017 |
| CN | 108174392 A | 6/2018 |

(Continued)

OTHER PUBLICATIONS

Extended European Search Report issued in corresponding European Application No. 20872762.8, dated Oct. 5, 2022, pp. 1-8.

(Continued)

*Primary Examiner* — Marisol Figueroa
(74) *Attorney, Agent, or Firm* — Hauptman Ham, LLP

(57) ABSTRACT

A network slice multicast method includes generating, by an access network device, a first message. The network slice multicast method further includes sending, by the access network device, the first message to a user equipment (UE). The first message comprises a first network slice identifier and configuration information of a multicast traffic channel, and the first network slice identifier corresponds to the multicast traffic channel.

18 Claims, 3 Drawing Sheets

(56) References Cited

U.S. PATENT DOCUMENTS

2021/0084525 A1   3/2021   Takano

FOREIGN PATENT DOCUMENTS

| | | |
|---|---|---|
| CN | 108366365 A | 8/2018 |
| CN | 109644330 A | 4/2019 |
| CN | 109769150 A | 5/2019 |
| CN | 110035398 A | 7/2019 |
| WO | 2018126342 A1 | 7/2018 |
| WO | 2018141134 A1 | 8/2018 |
| WO | 2018175974 A1 | 9/2018 |
| WO | 2019136128 A1 | 7/2019 |
| WO | 2019167474 A1 | 9/2019 |

OTHER PUBLICATIONS

China Unicom, China Unicom Views on Rel-17. 3GPP TSG RAN Meeting #84, Newport Beach, USA, Jun. 3-6, 2019, RP-191328, 11 pages.

Ericsson, Multiple network slices per UE. SA WG2 Meeting #113AH, Feb. 23-26, 2016, Sophia Antipolis, France, S2-160988, 4 pages.

Tian Longwei, Research on Network Slice Design and Management in SDN Scenario. South China University of Technology, Jan. 2019, 1 page.

Motorola Mobility, Lenovo, Broadcom, Solution: Multiple Independent Slices per UE. SA WG2 Meeting #116bis, Aug. 29-Sep. 2, 2016, Sanya, China, S2-164499, 7 pages.

Zhu Lin et al., Introduction to Key Technologies of 5G PPP in EU. CATV Technology, Dec. 2018, 5 pages.

Jianhua Tang et al., Service Multiplexing and Revenue Maximization in Sliced C-RAN Incorporated With URLLC and Multicast eMBB. IEEE Journal on Selected Areas in Communications, vol. 37, No. 4, Apr. 2019, 15 pages.

Huawei, Support of Network Slice Discovery. 3GPP TSG-RAN WG3 Meeting #93bis, Sophia Antipolis, France, Oct. 10-14, 2016, R3-162462, 3 pages.

International Search Report issued in corresponding International Application No. PCT/CN2020/116795, dated Dec. 21, 2020, pp. 1-11.

Chinese Office Action issued in corresponding Chinese Application No. 201910945418.8, dated Aug. 24, 2021, pp. 1-8.

Chinese Office Action issued in corresponding Chinese Application No. 201910945418.8, dated Jan. 30, 2022, pp. 1-6.

RAN WG3 Meeting #93, R3-161759, RAN Support for Core Network Slicing, Huawei, Gothenburg, Sweden, Aug. 22-26, 2016, total 13 pages.

Chinese Notice of Allowance issued in corresponding Chinese Application No. 201910945418.2, dated Jun. 21, 2022, pp. 1-4.

* cited by examiner

NETWORK SLICE MULTICAST METHOD AND APPARATUS

CROSS-REFERENCE TO RELATED APPLICATIONS

This application is a continuation of International Application No. PCT/CN2020/116795, filed on Sep. 22, 2020, which claims priority to Chinese Patent Application No. 201910945418.2, filed on Sep. 30, 2019. The disclosures of the aforementioned applications are hereby incorporated by reference in their entireties.

TECHNICAL FIELD

This application relates to the field of wireless communication technologies, and in particular, to a network slice multicast method and apparatus.

BACKGROUND

As a communication manner, a multicast (multicast) technology can effectively resolve a problem of single-point sending and multi-point receiving, thereby implementing efficient point-to-multipoint data transmission in a network, to save network bandwidth and reduce network load. When some devices (that is, receivers receivers) on a network need information, if a multicast manner is used, these devices can be added to a same multicast group. A multicast source (source) needs to send only one piece of information to the multicast group. This information is then sent accurately to each device in the multicast group.

A concept of network slice is introduced in a 5G network. How to implement multicast in a network with a network slice is a problem worth considering.

SUMMARY

This application provides a network slice multicast method and apparatus, to implement multicast at a network slice granularity.

According to a first aspect, this application provides a network slice multicast method. The method includes: generating, by an access network device, a first message; sending the first message to UE, where the first message includes a network slice identifier and configuration information of a multicast traffic channel, and the network slice identifier corresponds to the multicast traffic channel; receiving, by the UE, the first message from the access network device; and receiving, by the UE on the multicast traffic channel, multicast data corresponding to a network slice.

In the foregoing method, the access network device sends the network slice identifier and the configuration information of the multicast traffic channel to the UE, the network slice identifier corresponds to the multicast traffic channel, and the UE may directly obtain the network slice identifier and the configuration information of the multicast traffic channel. In this way, the UE can obtain the multicast data on the multicast traffic channel corresponding to the network slice identifier, thereby implementing multicast at a network slice granularity, and implementing a network slice-based multicast mechanism.

In a possible design, the method further includes: receiving, by the access network device, a network slice identifier and indication information from a core network device, where the indication information indicates multicast data corresponding to the network slice identifier. Optionally, the access network device may receive the network slice identifier and the indication information from the core network device after the access network device generates the first message.

By using the foregoing method, the access network device may determine, by receiving the network slice identifier and the indication information that are sent by the core network device, that the multicast data that corresponds to the network slice and that is sent by the core network device is possibly to be received subsequently, so that the access network device prepares for transmitting the multicast data, for example, generates the first message.

In a possible design, the first message may further include a temporary mobile group identity TMGI, and the TMGI corresponds to the network slice identifier.

By using the foregoing method, the access network device may further send the TMGI to the UE, and the TMGI corresponds to the network slice identifier. The UE may further directly obtain the TMGI corresponding to the network slice identifier. In this way, the UE can receive the multicast data on the multicast traffic channel corresponding to the TMGI and can learn of the network slice identifier corresponding to the multicast data, thereby implementing multicast at a network slice granularity, and implementing a network slice-based multicast mechanism. In addition, the access network device can send, to the UE by using one message, the configuration information of the multicast traffic channel corresponding to the network slice identifier and the TMGI corresponding to the network slice identifier. Therefore, signaling consumption is reduced.

In a possible design, the configuration information of the multicast traffic channel includes at least one of the following information: a last subframe configuration, a data modulation and coding value, a scheduling period, a logic channel identifier, a duration timer, a DRX inactivity timer, or a scheduling period start offset.

In a possible design, the access network device may further send, on the multicast traffic channel, multicast data corresponding to a network slice.

By using the foregoing method, the access network device sends, on the multicast traffic channel, the multicast data corresponding to the network slice. In this way, the UE can receive the multicast data on the multicast traffic channel corresponding to the network slice identifier, thereby implementing multicast at a network slice granularity, and implementing a network slice-based multicast mechanism.

In a possible design, the access network device may be an access network distributed unit DU.

According to a second aspect, this application provides a network slice multicast method. The method includes: generating, by an access network centralized unit CU, a multicast session establishment message, and sending the multicast session establishment message to an access network distributed unit DU, where the multicast session establishment message includes a multicast session identifier; receiving, by the DU, the multicast session establishment message sent by the CU; and sending, by the DU, a second message to UE, where the second message includes the multicast session identifier and configuration information of a multicast traffic channel, and the multicast session identifier corresponds to the multicast traffic channel.

In the foregoing method, the DU sends the multicast session establishment message to the CU, the CU sends the multicast session identifier and the configuration information of the multicast traffic channel to the UE, and the network slice identifier corresponds to the multicast traffic channel. The UE may directly obtain the network slice identifier and the configuration information of the multicast traffic channel. In this way, the UE can obtain multicast data on the multicast traffic channel corresponding to the network slice identifier. Therefore, in a CU-DU separation architecture, sending and receiving of a multicast session can also be implemented. In addition, when the multicast session identifier includes the network slice identifier, multicast at a network slice granularity can be implemented, and a network slice-based multicast mechanism is implemented.

In a possible design, the multicast session identifier includes at least one of the following information: a TMGI, a session identifier, or a network slice identifier. Optionally, the multicast session identifier may include the TMGI; the multicast session identifier includes the session identifier; the multicast session identifier includes the network slice identifier; the multicast session identifier includes the TMGI and the session identifier; the multicast session identifier includes the TMGI and the network slice identifier; the multicast session identifier includes the session identifier and the network slice identifier; or the multicast session identifier includes the TMGI, the session identifier, and the network slice identifier.

In a possible design, the DU may further feed back one piece of downlink user plane tunnel endpoint information to the CU, and the CU receives the piece of downlink user plane tunnel endpoint information from the DU; or the DU may feed back one group of downlink user plane tunnel endpoint information to the CU, where the group of downlink user plane tunnel endpoint information includes downlink user plane tunnel endpoint information corresponding to each multicast session, and the CU receives the group of downlink user plane tunnel endpoint information from the DU.

Optionally, when establishing a user plane tunnel shared by all multicast sessions, the DU feeds back one piece of downlink user plane tunnel endpoint information to the CU; and when establishing a user plane tunnel corresponding to each multicast session, the DU feeds back, to the CU, one group of downlink user plane tunnel endpoint information including downlink user plane tunnel endpoint information corresponding to each multicast session.

By using the foregoing method, the DU establishes a user plane tunnel corresponding to a multicast session between the DU and the CU, so that the multicast data can be transmitted between the CU and the DU. In this way, the DU can receive the multicast data through the user plane tunnel between the DU and the CU, and then send the multicast data to the terminal device UE, thereby implementing sending and receiving of the multicast session.

In a possible design, the CU may further send a third message to the DU, where the third message is used to indicate whether the DU feeds back one piece of downlink user plane tunnel endpoint information or one group of downlink user plane tunnel endpoint information; and the DU receives the third message from the CU.

Specifically, before the DU establishes the user plane tunnel between the DU and the CU, that is, before the DU feeds back the downlink user plane tunnel endpoint information to the CU, the CU sends the third message to the DU.

By using the foregoing method, the DU determines, by using the third message indicated by the CU, to establish a user plane tunnel shared by all multicast sessions or establish a user plane tunnel corresponding to each multicast session, thereby transmitting the multicast data.

In a possible design, the CU may further send a fourth message to the DU, where the fourth message is used to indicate to start the multicast session, and the fourth message includes the multicast session identifier; and the DU may further receive the fourth message from the CU.

By using the foregoing method, the CU indicates, by sending the fourth message including the multicast session identifier to the DU, the DU to start the multicast session. The DU determines to receive multicast data corresponding to which multicast session identifier from the CU through an F1 interface, so that the DU obtains, by using a control plane, the multicast session identifier corresponding to the multicast data, and the DU can send the multicast data on a multicast traffic channel corresponding to the multicast session identifier.

In a possible design, the method further includes: sending, by the CU, data to the DU through a public user plane tunnel, where the data includes multicast data and the multicast session identifier; and receiving, by the DU, the data from the CU through the public user plane tunnel.

By using the foregoing method, the CU sends, to the DU through the public user plane tunnel on the F1 interface, the data including the multicast data and the multicast session identifier, so that the DU obtains, by using a user plane, the multicast session identifier corresponding to the multicast data, and the DU can send the multicast data on a multicast traffic channel corresponding to the multicast session identifier.

According to a third aspect, this application provides a network slice multicast method. The method includes: obtaining, by a core network device a network slice identifier and a temporary mobile group identity TMGI, where the network slice identifier corresponds to the TMGI; sending, by the core network device, a non-access stratum NAS message to user equipment UE, where the NAS message includes the network slice identifier and the TMGI, and the network slice identifier corresponds to the TMGI; receiving, by the UE, the NAS message from the core network device; and receiving, by the UE on a multicast traffic channel corresponding to the TMGI, multicast data corresponding to a network slice.

In the foregoing method, the core network device sends the network slice identifier and the TMGI to the UE without changing an air interface, the TMGI corresponds to the network slice identifier, and the UE may further obtain the TMGI corresponding to the network slice identifier. In this way, the UE finally can receive, on the multicast traffic channel corresponding to the TMGI, the multicast data corresponding to the network slice, thereby implementing multicast at a network slice granularity, and implementing a network slice-based multicast mechanism.

In a possible design, the core network device may further obtain an application identifier, and the application identifier corresponds to the network slice identifier.

By using the foregoing method, the core network device obtains the network slice identifier and the application identifier, and the application identifier corresponds to the network slice identifier. In this way, the core network device can further send the application identifier corresponding to the network slice identifier to the UE. The UE can receive the multicast data on the multicast traffic channel of a TMGI corresponding to a network slice of an interested application, thereby implementing multicast at a network slice granularity, and implementing a network slice-based multicast mechanism.

In a possible design, the NAS message may further include identification information of an application, and the application identifier corresponds to the network slice identifier.

By using the foregoing method, the core network device may further send the identification information of the application to the UE, and the UE may further obtain the application identifier corresponding to the network slice identifier. In this way, the UE can receive the multicast data on the multicast traffic channel of the TMGI corresponding to the network slice of the interested application, thereby implementing multicast at a network slice granularity, and implementing a network slice-based multicast mechanism.

In a possible design, the UE may further receive a fifth message sent by a base station, where the fifth message includes a TMGI and configuration information of a multicast traffic channel, and the TMGI corresponds to the multicast traffic channel.

By using the foregoing method, the base station sends the fifth message including the TMGI and the configuration information of the multicast traffic channel to the UE without changing an air interface, the TMGI corresponds to the multicast traffic channel. The UE may find the corresponding TMGI by using an interested network slice, to receive the multicast data on the multicast traffic channel corresponding to the TMGI, thereby implementing multicast at a network slice granularity, and implementing a network slice-based multicast mechanism.

According to a fourth aspect, a network slice multicast apparatus is provided. The apparatus provided in this application has functions of the access network device, the UE, and the core network device in the foregoing method aspects, and includes corresponding means (means) configured to perform the steps or functions described in the foregoing method aspects. The steps or functions may be implemented by software, hardware (such as a circuit), or a combination of hardware and software. The access network device includes an access network device and/or a CU-DU.

In a possible design, the apparatus includes one or more processors and a communication unit. The one or more processors are configured to support the apparatus in performing corresponding functions of the access network device, the UE, and the core network device in the foregoing methods.

Optionally, the apparatus may further include one or more memories. The memory is configured to be coupled to the processor, and the memory stores program instructions and/or data that are/is necessary for the apparatus. The one or more memories may be integrated with the processor, or may be disposed independent of the processor. This is not limited in this application.

In another possible design, the apparatus includes a transceiver, a processor, and a memory. The processor is configured to control the transceiver or an input/output circuit to receive and send signals. The memory is configured to store a computer program. The processor is configured to run the computer program in the memory, so that the apparatus performs the method completed by the access network device or the UE in the first aspect or any possible implementation of the first aspect, the method completed by the access network device and the UE in the second aspect or any possible implementation of the second aspect, or the method completed by the core network device and the UE in the third aspect or any possible implementation of the third aspect.

In a possible design, the apparatus includes one or more processors and a communication unit. The one or more processors are configured to support the apparatus in performing corresponding functions of the access network device, the UE, and the core network device in the foregoing methods.

Optionally, the apparatus may further include one or more memories. The memory is configured to couple to the processor, and stores program instructions and/or data necessary for the access network device, the UE, and the core network device. The one or more memories may be integrated with the processor, or may be disposed independent of the processor. This is not limited in this application.

The apparatus may be located in the access network device, the UE, or the core network device, or may be the access network device, the UE, or the core network device.

In another possible design, the apparatus includes a transceiver, a processor, and a memory. The processor is configured to control the transceiver or an input/output circuit to receive and send signals. The memory is configured to store a computer program. The processor is configured to run the computer program in the memory, so that the apparatus performs the method completed by the access network device or the UE in the first aspect or any possible implementation of the first aspect, the method completed by the access network device and the UE in the second aspect or any possible implementation of the second aspect, or the method completed by the core network device and the UE in the third aspect or any possible implementation of the third aspect.

According to a fifth aspect, a computer-readable storage medium is provided, and is configured to store a computer program. The computer program includes instructions used to perform the method in the first aspect, the second aspect, or the third aspect, or any possible implementation of the first aspect, the second aspect, or the third aspect.

According to a sixth aspect, a computer program product is provided. The computer program product includes computer program code. When the computer program code is run on a computer, the computer is enabled to perform the method in the first aspect, the second aspect, or the third aspect, or any possible implementation of the first aspect, the second aspect, or the third aspect.

According to a seventh aspect, this application provides a chip system. The chip system includes a transceiver, configured to implement functions of the access network device, the UE, and the core network device in the methods in the foregoing aspects, for example, receive or send data and/or information in the foregoing methods. In a possible design, the chip system further includes a memory. The memory is configured to store program instructions and/or data. The chip system may include a chip, or may include a chip and another discrete component.

DESCRIPTION OF EMBODIMENTS

Figure 1:
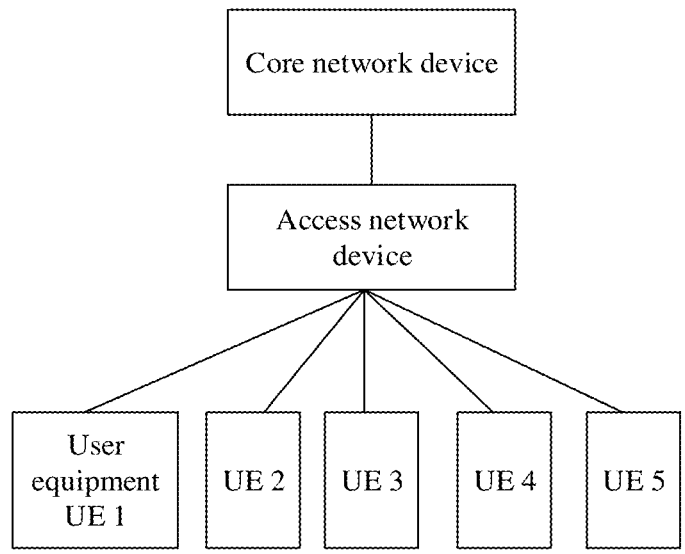
FIG. 1 is a schematic diagram of an application scenario according to an embodiment of this application.

The following further describes in detail the present invention with reference to the accompanying drawings.

Technical solutions in embodiments of this application may be applied to various communication systems, for example, a fourth generation (4th Generation, 4G) system, where the 4G system includes a long term evolution (long term evolution, LTE) system, a fifth generation (5th Generation, 5G) system such as a new radio access technology (new radio access technology, NR), and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

The following describes some terms in the embodiments of this application, to facilitate understanding of a person skilled in the art.

(1) User equipment (user equipment, UE) may also be briefly referred to as a terminal, is also referred to as a mobile station (mobile station, MS), a mobile terminal (mobile terminal, MT), or the like in a communication system, and is a device providing voice and/or data connectivity for a user, for example, a handheld device or a vehicle-mounted device that has a wireless connection function. Currently, examples of some terminals are: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(2) A network device is a device in a wireless network. For example, the network device may be a radio access network (radio access network, RAN) node (or device) that enables a terminal to access the wireless network, and may also be referred to as a base station. Currently, examples of some RAN nodes are: a further evolved NodeB (gNB), a transmission reception point (transmission reception point, TRP), an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB or a home Node B, HNB), a baseband unit (base band unit, BBU), a wireless fidelity (wireless fidelity, Wi-Fi) access point (access point, AP), and the like. In addition, in a network structure, the network device may include a centralized unit (centralized unit, CU) node, a distributed unit (distributed unit, DU) node, or a RAN device including a CU node and a DU node. A RAN device including a CU node and a DU node splits protocol layers of an eNB in a long term evolution (long term evolution, LTE) system. Functions of some protocol layers are centrally controlled by the CU, functions of some or all of remaining protocol layers are distributed in the DU, and the CU centrally controls the DU. For another example, the network device may be a core network (core network, CN) device that provides service support for the terminal. Common core network devices include an access and mobility management function (access and mobility management function, AMF) entity, a session management function (session management function, SMF) entity, a user plane function (user plane function, UPF) entity, and the like, which are not listed one by one herein. The AMF entity may be responsible for access management and mobility management of the terminal. The SMF entity may be responsible for session management, for example, establishment of user sessions, and the like. The UPF entity may be a functional entity on a user plane, and is mainly responsible for a connection to an external network.

(3) Data transmission mode: A wireless communication system mainly has three data transmission modes: unicast (unicast), broadcast (broadcast), and multicast (multicast).

(4) A cell, also referred to as a cellular cell, is an area (generally an area covered by a radio signal) covered by a base station or a part of a base station. A terminal located in the cell may communicate with the base station over a radio channel.

(5) CU-DU separation architecture: The CU-DU separation architecture is introduced in a 5G NR system, and one CU and a plurality of DUs form one base station. The CU is mainly responsible for a radio resource control (radio resource control, RRC) layer, a service data adaptation protocol (service data adaptation protocol, SDAP), and a packet data convergence protocol (packet data convergence protocol, PDCP) protocol layer. The DU is mainly responsible for a radio link control (radio link control, RLC) protocol, a media access control (media access control, MAC) layer, and a physical layer (physical layer, PHY) protocol layer. The CU and the DU are connected to each other through an F1 interface. The CU-DU separation architecture is also introduced for an LTE system. A difference is that the CU includes only an RRC protocol layer and a PDCP protocol layer. In addition, the CU and the DU in LTE are connected to each other through a W1 interface.

(6) Network slice (Network slice), also referred to as slices, are different logical networks customized based on different service requirements on a physical or virtual network infrastructure. A network slicing technology enables an operator to divide a plurality of virtual end-to-end networks on a hardware infrastructure. Each network slice is logically isolated from a device, an access network, a transport network, and a core network to meet different feature requirements of different types of services. The network slice may be a complete end-to-end network that includes a terminal, an access network, a transport network, a core network, and an application server, can provide a complete telecommunication service, and has a network capability. Alternatively, the network slice may be any combination of a terminal, an access network, a transport network, a core network, and an application server. The network slice may have one or more of the following characteristics: An access network may be sliced or may not be sliced. The access network may be shared by a plurality of network slices. Characteristics of different network slices may be different from network functions that form the different network slices.

(7) The terms "system" and "network" may be used interchangeably in the embodiments of this application. "A plurality of" means two or more, and another quantifier is similar to this. The term "and/or" describes an association relationship for describing associated objects and that three relationships may exist. For example, A and/or B may represent the following three cases: Only A exists, both A and B exist, and only B exists. In addition, an element (element) appearing in singular forms "a", "an" and "the" does not mean "one or only one" but "one or more" unless otherwise specified in the context. For example, "a device" means one or more such devices. Further, "at least one of (at least one of) . . . " means one or any combination of subsequent associated objects, for example, at least one of a, b, or c, which may represent a, b, c, a-b, a-c, b-c, or a-b-c, where a, b, and c may be single or multiple.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first data packet and a second data packet are merely used to distinguish between different data packets, but do not indicate a difference in content, priorities, sending orders, importance degrees, or the like of the two data packets.

A network slice concept is introduced in a 5G network, but an existing mechanism cannot support multicast at a network slice granularity, and cannot meet multicast at the network slice granularity. In view of this, to meet multicast at the network slice granularity, this application provides a network slice multicast method.

In the method, a network device sends configuration information of a multicast traffic channel corresponding to a network slice identifier to UE, then sends multicast data on a multicast traffic channel corresponding to a network slice. The network device includes an access network device and/or a core network device. The UE receives the configuration information of the multicast traffic channel corresponding to the network slice identifier. When listening to the multicast data, the UE may listen to the multicast data on a multicast traffic channel corresponding to an interested network slice, thereby implementing multicast at a network slice granularity.

Specifically, in the method, the access network device sends a first message to the UE, where the first message includes a network slice identifier and configuration information of a multicast traffic channel, and the network slice identifier corresponds to the multicast traffic channel. The UE receives the first message, and may listen to the multicast data on a multicast traffic channel corresponding to an interested network slice, thereby implementing multicast at a network slice granularity. Alternatively, a DU sends a second message to the UE, where the second message includes a multicast session identifier and configuration information of a multicast traffic channel, and the multicast session identifier corresponds to the multicast traffic channel. In this way, sending and receiving of a multicast session can also be implemented in a CU-DU separation architecture. Furthermore, when the multicast session identifier includes the network slice identifier, multicast at a network slice granularity can also be implemented. Alternatively, the core network device sends a non-access stratum (non-access stratum, NAS) message to the UE, where the NAS message includes a network slice identifier and a TMGI, and the network slice identifier corresponds to the TMGI. The UE receives the NAS message, and may listen to multicast data on a multicast traffic channel of the TMGI corresponding to an interested network slice, thereby implementing multicast at a network slice granularity.

FIG. 1 is a schematic diagram of an application scenario according to this application. In the scenario, there are a network device (for example, a core network device and an access network device shown in FIG. 1) and a plurality of UEs (for example, UE 1, UE 2, UE 3, UE 4, and UE 5 shown in FIG. 1). The network device may send, to the UEs, identification information of a multicast traffic channel corresponding to a network slice identifier. In a multicast data transmission process, the core network device may send multicast data to the access network device, and the access network device sends the multicast data to the UEs on a multicast traffic channel corresponding to a network slice.

For example, the network slice identifier includes a slice 1 and a slice 2. Specifically, in the multicast data transmission process, the core network device may send multicast data of the slice 1 and multicast data of the slice 2 to the access network device; and the access network device may send the multicast data of the slice 1 to the UE 1, the UE 2, and the UE 3 on a multicast traffic channel corresponding to the slice 1, and send the multicast data of the slice 2 to the UE 4 and the UE 5 on a multicast traffic channel corresponding to the slice 2. In this way, the UE 1, the UE 2, and the UE 3 can listen to the multicast data of the slice 1 on the multicast traffic channel corresponding to the slice 1; and the UE 4 and the UE 5 can listen to the multicast data of the slice 2 on the multicast traffic channel corresponding to the slice 2, thereby implementing multicast in a network with network slices.

An embodiment of this application provides a network slice multicast method. The method may be applied to the application scenario shown in FIG. 1. The following describes a specific process of network slice multicast in the following manners.

Figure 2:
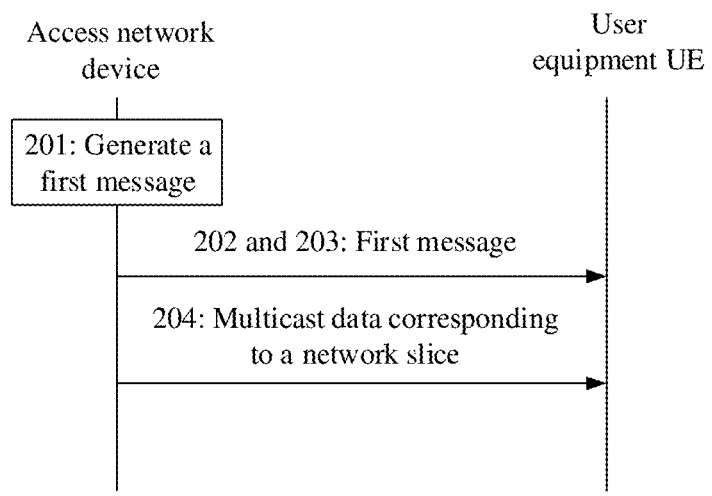
FIG. 2 is a schematic diagram of a network slice multicast procedure according to an embodiment of this application.

Manner 1:

First, refer to a multicast process of a network slice shown in FIG. 2. The method includes the following steps:

Step 201: An access network device generates a first message, where the first message includes a network slice identifier and configuration information of a multicast traffic channel, and the network slice identifier corresponds to the multicast traffic channel.

In this embodiment of this application, the access network device may be a base station or a DU.

The first message includes the network slice identifier and the configuration information of the multicast traffic channel, that is, the first message supports the configuration information of the multicast traffic channel corresponding to the network slice. For example, the first message may be a SlicingMBMSConfiguration (slicing multimedia broadcast service configuration) message sent on a Slicing-MCCH (slicing-multicast control channel), and includes the network slice identifier and the corresponding configuration information of the multicast traffic channel.

Optionally, the first message may further include a TMGI, and the TMGI corresponds to the network slice identifier.

For example, the access network device may include the network slice identifier in the message supporting the configuration information of the multicast traffic channel corresponding to the TMGI, to generate the first message.

The message supporting the configuration information of the multicast traffic channel corresponding to the TMGI may be an MBSFNAreaConfiguration (multicast broadcast over single frequency network area configuration) message sent on a multicast control channel (multicast control channel, MCCH) or an SCPTMConfiguration (single-cell point-to-multipoint configuration) message sent on a single-cell multicast control channel (single-cell multicast control channel, SC-MCCH). That is, the message includes the TMGI, the network slice identifier, and the configuration information of the corresponding multicast traffic channel.

Specifically, the multicast traffic channel includes a multicast traffic channel (multicast traffic channel, MTCH) and/or a single-cell multicast traffic channel (single-cell multicast traffic channel, SC-MTCH).

For example, the access network device broadcasts a system information block type (system information block type, SIB) message (such as a SIB13 message or a SIB20 message), where the SIB message includes configuration information of the MCCH/SC-MCCH. Next, the access network device sends the TMGI and the configuration information of the MTCH/SC-MTCH on the MCCH/SC-MCCH. Subsequently, the access network device sends multicast data on the MTCH/SC-MTCH. For example, in a multimedia broadcast multicast service (multimedia broadcast multicast service, MBMS) mechanism based on a multicast broadcast over single frequency network (multicast broadcast over single frequency network, MBSFN), the access network device broadcasts the configuration information of the MCCH by using a SIB13 message, sends the TMGI and the configuration information of the MTCH on the MCCH, and then sends the multicast data on the MTCH. In a single cell-point to multi-point (single cell-point to multi-point, SC-PTM) mechanism, the access network device broadcasts the configuration information of the SC-MCCH by using a SIB20 message, sends the TMGI and the configuration information of the SC-MTCH on the MCCH, and finally sends the multicast data on the SC-MTCH.

The configuration information of the multicast traffic channel includes at least one of the following information: a last subframe configuration, a data modulation and coding value, a scheduling period, a logic channel identifier, a duration timer, a DRX inactivity timer, or a scheduling period start offset.

For example, in the MBMS mechanism based on the MBSFN, the multicast traffic channel is the MTCH. The configuration information of the multicast traffic channel includes at least one of the following information: a last subframe configuration (such as the last subframe configuration sf-allocend), a data modulation and coding value (such as the data modulation and coding scheme datamcs), a scheduling period (such as the multi-channel scheduling period mch-scheduling period), a logic channel identifier (such as the logic channel identifier logical channel identity or LCID). In the MBMS mechanism based on the SC-PTM, the multicast traffic channel is the SC-MTCH. The configuration information of the multicast traffic channel includes at least one of the following information: a duration timer (such as the SCPTM duration timer onDurationTimerSCPTM), a DRX inactivity timer (such as the SCPTM discontinuous reception inactivity timer drx-InactivityTimerSCPTM), or a scheduling period start offset (such as the SCPTM scheduling period start offset schedulingPeriodStartOffsetSCPTM). In a future NR MBMS mechanism, the multicast traffic channel may be bound to a data radio bearer (data radio bearer, DRB). To be specific, if a base station includes a mapping relationship between a DRB ID and a group-radio network temporary identifier (group-radio network temporary identifier, G-RNTI) in an RRC re-configuration message, it is considered that the data radio bearer is equivalent to the multicast traffic channel.

The TMGI corresponds to the configuration information of the multicast traffic channel means that the TMGI corresponds to the multicast traffic channel. That is, the multicast traffic channel is the multicast traffic channel on which the UE listens to multicast data of an interested TMGI. The TMGI in which the UE is interested may be a TMGI corresponding to an application (application, APP) in which the UE is interested, that is, the TMGI associated with the APP in which the UE is interested.

The network slice identifier corresponds to the multicast traffic channel. That is, the multicast traffic channel is the multicast traffic channel on which the UE listens to multicast data of an interested network slice. The network slice in which the UE is interested may be a network slice corresponding to an APP in which the UE is interested, that is, the network slice associated with the APP in which the UE is interested.

The TMGI corresponds to the network slice identifier. That is, the TMGI is the TMGI when the UE listens to multicast data of the interested network slice.

For example, the access network device may generate the first message by using one of the following implementations, and the first message supports the configuration information of the multicast traffic channel corresponding to the network slice. The first message does not conflict with the message supporting the configuration information of the multicast traffic channel corresponding to the TMGI.

1. For example, the first message includes Slicing-MTCH configuration information. The Slicing-MTCH configuration information is as follows, where Slicing-MTCH-Info (slicing-multicast control channel) is Slicing-MTCH configuration information, sliceID is a network slice identifier, g-RNTI (group-radio network temporary identifier) is information related to a G-RNTI, and slicing-mtch-schedulingInfo (slicing-multicast control channel scheduling information) is the configuration information of the multicast traffic channel:

```
Slicing-MTCH-Info::=         SEQUENCE{
    sliceID                      SliceID,
    g-RNTI                       BIT STRING(SIZE(16)),
    slicing-mtch-schedulingInfo  Slicing-MTCH-SchedulingInfo
    ...
}
```

2. For example, the first message includes slicing-PMCH (slicing-physical multicast channel) configuration information. The slicing-PMCH configuration information is as follows, where Slicing-PMCH-Info (slicing-physical multicast channel information) is slicing-PMCH configuration information, sliceID is a network slice identifier, and pmch-Config (physical multicast channel configuration) is the configuration information of the multicast traffic channel:

```
Slicing-PMCH-Info::=        SEQUENCE {
    pmch-Config             PMCH-Config,
    sliceID                 SliceID,
    ...
}
```

3. For example, the first message includes each MBMS-SessionInfo (multimedia broadcast multicast service session information) information element in Slicing-MBMS-SessionInfo (slicing-multimedia broadcast multicast service session information). The MBMS-SessionInfo information element is as follows, where MBMS-SessionInfo is an MBMS-SessionInfo information element in the Slicing-MBMS-SessionInfo, sliceID is a network slice identifier, and logicalChannelIdentity (logic channel identity) is the configuration information of the multicast traffic channel (specifically, is information related to an LCID):

```
MBMS-SessionInfo::=         SEQUENCE {
    sliceID                 SliceID,
    logicalChannelIdentity  INTEGER (0..maxSessionPerPMCH-1),
    ...
}
```

For example, the access network device may generate the first message by using one of the following implementations, and the first message supports a TMGI, identification information of a network slice, and configuration information of a multicast traffic channel. Specifically, the identification information of the network slice is included in the message supporting the configuration information of the multicast traffic channel corresponding to the TMGI.

1. For example, the first message includes SC-MTCH-Info (single-cell multicast traffic channel information) in an SC-mtch-InfoList (single-cell multicast traffic channel information list) in an SCPTMConfiguration (single cell-point to multi-point configuration) of an SC-MCCH-Message (single-cell multicast control channel), where SC-MTCH-Info (single-cell multicast traffic channel information) supports the configuration information of the multicast traffic channel corresponding to the TMGI, mbmsSessionInfo (multimedia broadcast multicast service session information) is information related to a multicast session, sliceID is a network slice identifier, and g-RNTI, sc-mtch-schedulingInfo (single-cell multicast traffic channel scheduling information) and an sc-mtch-neighbourCell (single-cell multicast traffic channel neighbor cell) all are configuration information of the multicast traffic channel. In this implementation, a plurality of multicast sessions correspond to a same network slice identifier:

```
SC-MTCH-Info::=             SEQUENCE{
    mbmsSessionInfo         MBMSSessionInfo,
    sliceID                 SliceID,
    g-RNTI                  BIT STRING(SIZE(16)),
    sc-mtch-schedulingInfo  SC-MTCH-SchedulingInfo
    sc-mtch-neighbourCell   BIT STRING (SIZE(maxNeighCell-
    SCPTM))
    ...,
}
```

2. For example, the first message includes mbmsSessionInfo in SC-MTCH-Info in an SC-mtch-InfoList in an SCPTMConfiguration of an SC-MCCH-Message, where MBMSSessionInfo supports the configuration information of the multicast traffic channel corresponding to the TMGI, tmgi (temporary mobile group identity) and sessionId-r13 (session identifier) are configuration information of the multicast traffic channel, and sliceID is a network slice identifier:

```
MBMSSessionInfo::=          SEQUENCE{
    tmgi                    TMGI,
    sliceID                 SliceID,
    sessionId               OCTET STRING (SIZE (1))
    ...
}
```

3. For example, the first message includes PMCH-Info (physical multicast channel information) in a PMCH-Info-List (physical multicast channel information list) in an MBSFNAreaConfiguration of an MCCH-Message, where PMCH-Info supports the configuration information of the multicast traffic channel corresponding to the TMGI, pmch-Config and mbms-SessionInfoList (the multimedia broadcast multicast service session information) are configuration information of a multicast traffic channel, sliceID is a network slice identifier, and a plurality of multicast sessions correspond to a same network slice identifier in this implementation:

```
PMCH-Info::=                SEQUENCE {
    pmch-Config             PMCH-Config,
    sliceID                 SliceID,
    mbms-SessionInfoList    MBMS-SessionInfoList,
    ...
}
```

4. For example, the first message includes mbms-SessionInfo of an mbms-SessionInfoList, where MBMS-SessionInfo supports the configuration information of the multicast traffic channel corresponding to the TMGI, tmgi (TMGI), sessionId (the session identifier), and logicalChannelIdentity are configuration information of a multicast traffic channel, sliceID is a network slice identifier, and one multicast session corresponds to one network slice identifier in this implementation:

```
MBMS-SessionInfo::=         SEQUENCE {
    tmgi                    TMGI,
    sliceID                 SliceID,
    sessionId               OCTET STRING (SIZE (1))
    logicalChannelIdentity  INTEGER (0..maxSessionPerPMCH-1),
    ...
}
```

Step 202: The access network device sends the first message to the UE.

For example, the access network device sends the first message on a multicast control channel. The first message includes the network slice identifier and the configuration information of the multicast traffic channel. For example, the access network device may alternatively send the first message to the UE by using an RRC re-configuration message.

Optionally, the access network device receives a network slice identifier and indication information from a core network device, where the indication information indicates multicast data corresponding to the network slice identifier. In this way, after the access network device sends the first message to the UE, the access network device may further send multicast data on a multicast traffic channel of the network slice identifier based on the first message. The multicast data is multicast data of the network slice identifier from the core network device.

Step 203: The UE receives the first message from the access network device.

After receiving the first message, the UE may further correspondingly store the network slice identifier and the configuration information of the multicast traffic channel in the first message.

Step 204: The UE receives, on the multicast traffic channel, the multicast data corresponding to the network slice.

The UE may listen to the multicast data corresponding to the network slice on the multicast traffic channel corresponding to an interested network slice. When the multicast traffic channel is a DRB, the UE may listen to the multicast data corresponding to the network slice on the DRB corresponding to the network slice.

In a scenario of an LTE MBMS mechanism, a mobility management entity (Mobility Management Entity, MME) sends an MBMS session start (MBMS session start) message to a multi-VPN-instance CE (Multi-VPN-Instance CE, MCE). The MBMS session start message is used to indicate to start a multicast session. The MBMS session start message includes an MBMS service area (MBMS service area/MBMS service range), and may further include an MBMS cell list (MBMS cell list). After receiving the MBMS session start message, the MCE may determine a multicast range. Then, the MCE sends an MBMS session start message to a base station within the multicast range, where the MBMS session start message includes an MBMS service area. In addition, for an SC-PTM mechanism, the MBMS session start message further includes SC-PTM information, and the SC-PTM information includes an MBMS cell list. However, a 5G NR MBMS mechanism has not been determined currently. Therefore, in the manner 1 in this embodiment of this application, an impact of the manner 1 on the MBMS session start message may further be considered.

Therefore, in a possible implementation, in the LTE MBMS mechanism, the MBMS session start message includes a network slice identifier, and the network slice identifier is used by a receiving party to determine a sending range of a multicast session based on the network slice identifier. For example, the access network device determines, based on the network slice identifier in the MBMS session start message sent by the core network device, that the sending range of the multicast session does not exceed a coverage range of a cell corresponding to the network slice identifier. In this way, when the access network device sends multicast data of a multicast session, a sending range of the multicast data is limited to the cell (for example, an identity of the cell) to which the network slice identifier is mapped.

In another possible implementation, if the first message generated in step 201 supports the configuration information of the multicast traffic channel corresponding to the network slice, an MBMS session start message (such as a slicing MBMS session start message) for a network slice may further be introduced, and the access network device determines a sending range of a multicast session. For example, the access network device receives an MBMS session start message sent by the core network device for a network slice. The MBMS session start message for the network slice includes identification information of the network slice. The access network device determines that the sending range of the multicast session does not exceed a coverage range of a cell corresponding to the network slice identifier. In this way, when the access network device sends multicast data of a multicast session, a sending range of the multicast data is limited to the cell (for example, an identity of the cell) to which the network slice identifier is mapped.

In still another possible implementation, if the first message generated in step 201 supports the configuration information of the multicast traffic channel corresponding to the network slice, an MBMS session start message (such as a slicing MBMS session start message) for a network slice may further be introduced, and the access network device determines a sending range of a multicast session. For example, the core network device determines that the sending range of the multicast session does not exceed a coverage range of a cell corresponding to the identification information of the network slice. For example, the AMF/MME sends an MBMS session start message for a network slice to the SMF/MCE, where the MBMS session start message for the network slice includes a network slice identifier. The SMF/MCE limits a sending range of a multicast session within a coverage range of a cell corresponding to identification information of a network slice; or the core network device determines, based on identification information of a network slice, an identity of a cell corresponding to the identification information of the network slice, and determines a sending range of a multicast session based on the coverage range corresponding to the cell and an obtained service area (service area) range. For example, the AMF/MME sends an MBMS session start message for a network slice to the SMF/MCE, where the MBMS session start message for the network slice includes a network slice identifier and a service area identifier (such as a service area ID). The SMF/MCE may obtain an intersection set between the coverage area of the cell corresponding to the network slice identifier and the service area range, and determine that a cell in the intersection set is the sending range of the multicast session.

A concept of hop on slice is proposed in a related patent, and hop on slice (network slice instant communication) is also referred to as a network slice instant communication manner. On a RAN side, a base station broadcasts, on an air interface, data radio bearer (Data Radio Bearer, DRB) configuration information corresponding to a slice. It is assumed that the DRB configuration information corresponding to the slice is included in system information x. In this way, UE does not need to establish an RRC connection to the base station, and may directly configure a DRB corresponding to the slice to directly send data to the base station. If a user plane tunnel corresponding to the slice is established in advance between the base station and the core network device, the base station identifies the corresponding slice by using the DRB, and then may send data to the core network through the user plane tunnel corresponding to the slice. Based on the base station of the Hop on slice, the core network device may deliver multicast data of the slice to the UE. However, the UE supporting the hop on slice mechanism listens only to the system information x, the multicast-related information (including the configuration information of the multicast control channel) is included in system information y, and the system information y is different from the system information x. Therefore, because the UE does not listen to the system information y, the UE cannot obtain the related information of the multicast control channel in the system information y, and therefore cannot listen to the configuration information of the multicast traffic channel and cannot listen to the multicast data on the corresponding multicast traffic channel. Therefore, in the manner 1 in this embodiment of this application, it may be further considered to indicate, with reference to the manner 1, the UE to read the system information y. This improvement is mainly made for a scenario in which DRB configuration information corresponding to a slice is included in the system information x, but multicast-related information is included in the system information y.

For the SIB 13 corresponding to the MBMS mechanism based on the MBSFN and the SIB 20 corresponding to the SC-PTM mechanism, the SIB 20 is mainly described in this embodiment of this application. A process of using the SIB 13 is similar. Therefore, details are not described again.

In a possible implementation, the multicast-related information is included in the system information x. The configuration information of the multicast control channel, the network slice identifier, and the DRB configuration information are included in a same message. In this way, the access network device may not additionally send the configuration information of the multicast control channel corresponding to the slice, thereby avoiding increasing extra signaling overheads.

For example, the system message x is as follows, Slice list is a network slice list, slice ID is a network slice identifier, DRB configuration (DRB configuration) is configuration information of a DRB, MCCH configuration (multicast control channel configuration) is multicast-related information:

Slice list
>slice ID
>DRB configuration
>MCCH configuration

Or

Slice list
>slice ID>
DRB configuration
MCCH configuration

In a first method, one MCCH configuration corresponds to one network slice identifier. In a second method, all network slice identifiers share one MCCH configuration.

In another possible implementation, the access network device may send first indication information to the UE, where the first indication information is used to indicate that the UE needs to read multicast data. If the UE is specifically UE working on a hop on slice, the UE is UE receiving the multicast data merely by using a network slice mechanism.

Optionally, in addition to the first indication information, the access network device further sends, to the UE, information indicating a system message to be read by the UE. If the first indication information is used to indicate the UE to read the first message in the manner 1, the first indication information indicates the UE to read the configuration information of the multicast control channel. For example, if the configuration information of the multicast control channel related to the network slice is included in the SIB 20, a type of the system message that the first indication information indicates the UE to read is the SIB 20. The UE may obtain the configuration information of the multicast control channel MCCH by using the SIB 20. Then, the UE can obtain, by listening on the MCCH, the configuration information of the multicast traffic channel corresponding to the network slice identifier.

Optionally, if the access network device includes the configuration information of the multicast control channel, the network slice identifier, and the configuration information of the multicast traffic channel in a same SIB, the UE can obtain, only by listening to a broadcast message, the configuration information of the multicast traffic channel corresponding to the network slice identifier. This is also adaptable to a subsequent method, and details are not described again subsequently.

Optionally, the first indication information, the network slice identifier, and the DRB configuration information may be included in a same message. For example, the configuration information of the multicast control channel related to the network slice is included in the SIB 20. The access network device includes, in the system information x, the DRB configuration information corresponding to the network slice identifier and the first indication information used to indicate the UE to read the SIB 20. The UE may obtain the configuration information of the multicast control channel based on the first indication information by reading the SIB 20, and then may obtain the network slice identifier and the configuration information of the multicast traffic channel by listening on the multicast control channel, where the network slice identifier corresponds to the multicast traffic channel.

For example, an information element sent by the access network device to the UE is shown below, where the information element includes a network slice identifier (slice ID), DRB configuration (DRB configuration) information, first indication information (a broadcast indication broadcast indication), and a system message type (a SIB type for an MBMS SIB type for MBMS), and the system message type is an optional information element:

Slice list
>slice ID>
DRB configuration
>broadcast indication
>SIB type for MBMS (optional)

Optionally, configuration information of a multicast control channel that needs to be included in a SIB message (for example, the SIB 20) may be stipulated in a protocol. For example, the core network device indicates that the access network device has multicast data corresponding to the network slice identifier, that is, may subsequently send slice-specific (network slice-specific) multicast data. The access network device generates the SIB message (for example, the SIB 20) including the configuration information of the multicast control channel. In addition, a multicast user plane tunnel for a network slice is established between the access network device and the core network device. Alternatively, in addition to unicast data and multicast data, the user plane tunnel between the access network device and the core network further supports the multicast data for the network slice. In this case, the core network device may further include a multicast indication in a GTP-U (GPRS tunnel transport protocol-user plane) of an NG3 interface (that is, between a base station and a UPF).

In still another possible implementation, if the core network device receives information transmitted by the UE in a hop on slice manner, the core network device sends a network slice identifier and second indication information to the UE. The second indication information is used to indicate that there is multicast data of the network slice. In this way, the UE can determine which network slice has the multicast data. Correspondingly, the UE listens to the SIB message that is broadcast by the access network device and that includes the configuration information of the multicast control channel; then, obtains the configuration information of the multicast traffic channel corresponding to the network slice by listening on the multicast control channel; and subsequently, may listen to the multicast data on the multicast traffic channel corresponding to the network slice with the multicast data.

Optionally, when registering for the first time, the UE may send, to the core network device, the indication information transmitted by the UE in a hop on slice manner.

In the solution provided in the manner 1 in this embodiment of this application, the access network device sends the network slice identifier and the configuration information of the multicast traffic channel to the UE by changing the air interface, the network slice identifier corresponds to the multicast traffic channel, and the UE may directly obtain the network slice identifier and the configuration information of the multicast traffic channel. In this way, the UE can obtain the multicast data on the multicast traffic channel corresponding to the network slice identifier, thereby implementing multicast at a network slice granularity, and implementing a network slice-based multicast mechanism.

Figure 3:
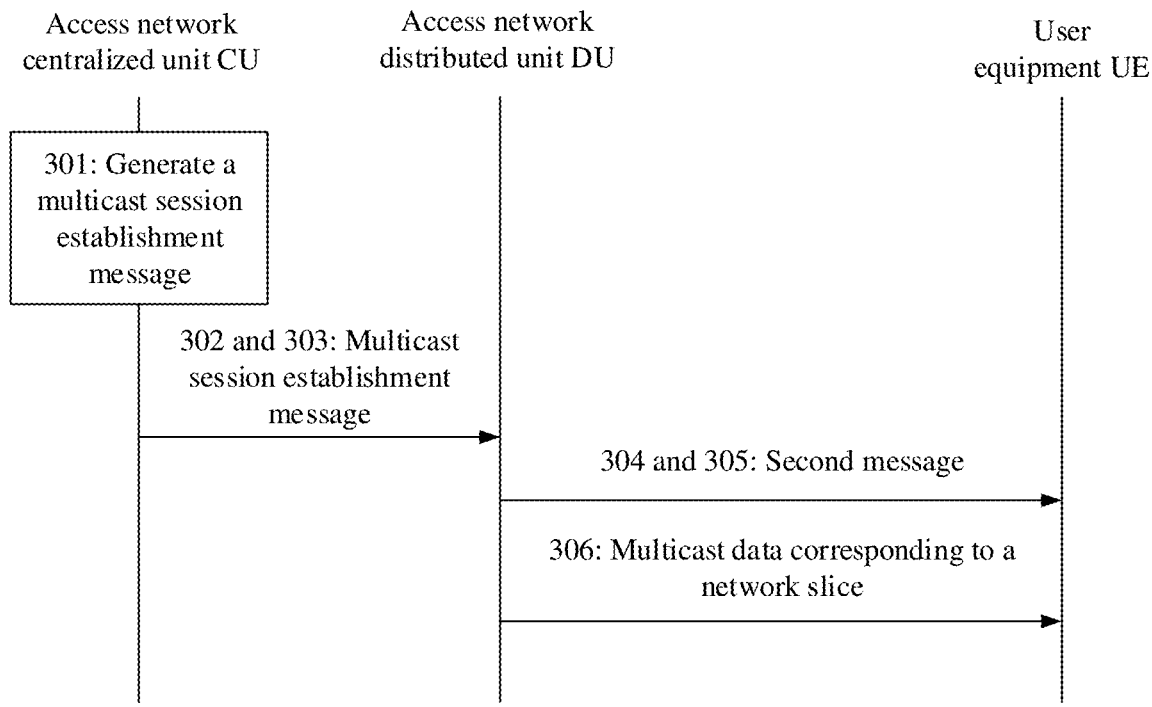
FIG. 3 is a schematic diagram of a network slice multicast procedure according to an embodiment of this application.

Manner 2:

First, refer to a multicast process of a network slice shown in FIG. 3. The process mainly includes that a DU sends a second message to UE, where the second message includes a multicast session identifier and configuration information of a multicast traffic channel, the multicast session identifier corresponds to the multicast traffic channel. The process includes the following steps.

Step 301: A CU generates a multicast session establishment message, where the multicast session establishment message includes a multicast session identifier.

The multicast session establishment message is used to establish a multicast session. A message name of the multicast session establishment message is not limited in this embodiment of this application. For example, the multicast session establishment message may be an MBMS session setup request (MBMS session setup request) message.

The multicast session identifier includes at least one of the following information: a TMGI, a session identifier, or a network slice identifier. For example, the identification information of the multicast session may include the TMGI; the identification information of the multicast session includes the session identifier; the multicast session identifier includes the network slice identifier; the multicast session identifier includes the TMGI and the session identifier; the multicast session identifier includes the TMGI and the network slice identifier; the multicast session identifier includes the session identifier and the network slice identifier; or the multicast session identifier includes the TMGI, the session identifier, and the network slice identifier. Particularly, the multicast session identifier may further be a group-radio network temporary identifier G-RNTI. A case of identifying a multicast session by using the G-RNTI identifier is applicable to a future NR MBMS mechanism, that is, an MBMS is implemented by using a DRB of the UE. The access network device is to notify the UE of a correspondence between a DRB ID and a G-RNTI. For example, an access network device includes the DRB ID and the G-RNTI in an RRC re-configuration message. In addition, it is assumed that the CU further notifies the DU of DRBs of UEs associated with the G-RNTI. For example, the CU sends the following list to the DU:

G-RNTI
UE list
>UE ID>
DRB ID where UE ID may be a gNB-CU UE F1AP ID, a gNB-DU UE F1AP ID, or a cell-radio network temporary identifier (cell-radio network temporary identifier, C-RNTI); and DRB ID may be a DRB ID or UP TNL information (uplink transport network layer information), for example, a tunnel endpoint address (tunnel endpoint identity, TEID).

It is assumed that a user plane tunnel corresponding to G-RNTI is established between the CU and the DU. If the DU has received, from the user plane tunnel corresponding to the G-RNTI, multicast data sent by the CU, the DU sends, based on the list (for example, the UE list UE list) sent by the CU, the multicast data on the DRB corresponding to the UE in the UE list, where the list includes the DRB corresponding to the UE, so that a CU-DU architecture supports a multicast mechanism.

If no user plane tunnel corresponding to the G-RNTI is established between the CU and the DU and the multicast data is transmitted through the user plane tunnel corresponding to the DRB of the UE, when the CU sends data through the user plane tunnel corresponding to the DRB of the UE, the CU further needs to be capable of indicating whether a current data packet of the DU is unicast or multicast, so that the DU determines whether to use a C-RNTI or the G-RNTI to scramble the data. For example, the CU may add a 1-bit indication to a GTP-U header (header). When the value is 0, it indicates unicast, and the DU determines to use the C-RNTI to scramble the data. When the value is 1, it indicates multicast, and the DU determines to use the G-RNTI to scramble the data.

Optionally, the multicast session establishment message may further include configuration information of a multicast traffic channel and/or third indication information. The third indication information is used to indicate whether the base station uses an MBSFN mechanism or an SC-PTM mechanism for air interface multicast. The multicast traffic channel includes an MTCH or an SC-MTCH.

Step 302: The CU sends the multicast session establishment message to the DU. The CU and the DU belong to the same access network device.

In addition, the CU may further send a third message to the DU, where the third message is used to indicate whether the DU feeds back one piece of downlink user plane tunnel endpoint information or one group of downlink user plane tunnel endpoint information. The DU may establish a user plane tunnel corresponding to multicast of the CU based on an indication in the third message from the CU. The third message and the multicast session establishment message may be a same message, or the third message and the multicast session establishment message are different messages.

The CU may further send indication information to the DU. The indication information is used to indicate the DU to establish a public user plane tunnel for all multicast sessions or establish one corresponding user plane tunnel for each multicast session.

Step 303: The DU receives the multicast session establishment message sent by the CU.

Specifically, the DU may feed back one piece of downlink user plane tunnel endpoint information to the CU, that is, the DU establishes a public user plane tunnel for all multicast sessions. Alternatively, the DU feeds back one group of downlink user plane tunnel endpoint information to the CU, where the group of downlink user plane tunnel endpoint information includes downlink user plane tunnel endpoint information corresponding to each multicast session, that is, the DU establishes a corresponding user plane tunnel for each multicast session. For example, one group of downlink user plane tunnel endpoint information includes each multicast session identifier and corresponding downlink user plane tunnel endpoint information.

Correspondingly, the CU receives one piece of downlink user plane tunnel endpoint information from the DU. Alternatively, the CU receives one group of downlink user plane tunnel endpoint information from the DU, where the group of downlink user plane tunnel endpoint information includes downlink user plane tunnel endpoint information corresponding to a user plane tunnel of each multicast session.

Step 304: The DU sends a second message to the UE, where the second message includes a multicast session identifier and configuration information of a multicast traffic channel, and the multicast session identifier corresponds to the multicast traffic channel.

For example, the second message may be generated by the CU and sent to the DU, or the second message may be generated by the DU. If the CU generates a second message and sends the second message to the DU, the DU sends the configuration information of the multicast traffic channel to the CU. The CU generates a corresponding second message based on the configuration information of the multicast traffic channel and sends the second message to the DU. The DU sends the second message to the UE. For example, the DU sends the second message on an MCCH/SC-MCCH. If the DU generates the second message, the CU notifies the DU of multicast data corresponding to a subsequent multicast session identifier. The DU generates the second message based on the multicast session identifier and the configuration information of the multicast traffic channel. The DU broadcasts the second message to the UE.

For the second message, refer to the first message in step 201 in the foregoing manner 1. For details, refer to the configuration information of the multicast traffic channel in step 201. Details are not described herein again.

If the DU establishes a public user plane tunnel for all multicast sessions, when the multicast data starts transmission, the DU needs to determine that multicast data has been received or to-be-received multicast data is multicast data for which multicast session. In this way, the DU determines, based on the multicast session to which the determined multicast data belongs, UEs to which the multicast data is to be delivered.

In a possible implementation, the method is referred to as a method for indicating a multicast session identifier by a control plane. The CU may further send a fourth message to the DU, and the DU receives the fourth message from the CU. The fourth message is used to indicate to start a multicast session, and the fourth message includes a multicast session identifier. A message name of the fourth message is not limited in this embodiment of this application. For example, the fourth message is an MBMS session start (MBMS session start) message. The fourth message may further include a multicast session identifier, so that the DU determines it is the multicast data corresponding to multicast session identifier that is subsequently received on the user plane tunnel.

Further, the fourth message may include a cell list (cell list). In this way, the CU determines the cell list based on the multicast session identifier and/or an MBMS service area. Before the CU determines the cell list, the DU may further report a mapping relationship between a multicast session identifier and a cell identity.

In another possible implementation, the method is referred to as a method for carrying a multicast session identifier by a user plane tunnel. The CU may further send data to the DU through a public user plane tunnel. The DU receives the multicast data from the CU through the public user plane tunnel, where the multicast data includes multicast data and the multicast session identifier. For example, the CU includes the identification information of the multicast session in a GTP-U header of an F1 user plane tunnel, so that the DU learns of a multicast traffic channel that corresponds to the identification information of the multicast session and on which the multicast data is subsequently sent.

Step 305: The UE receives the second message sent by the DU.

Step 306: The UE receives, on the multicast traffic channel, the multicast data corresponding to the network slice.

In the solution provided in the manner 2 in this embodiment of this application, the DU sends the session establishment message to the CU, the CU sends the multicast session identifier and the configuration information of the multicast traffic channel to the UE, and the network slice identifier corresponds to the multicast traffic channel. The UE may directly obtain the network slice identifier and the configuration information of the multicast traffic channel. In this way, the UE can obtain multicast data on the multicast traffic channel corresponding to the network slice identifier. Therefore, in a CU-DU separation architecture, sending and receiving of a multicast session can also be implemented. In addition, when the multicast session identifier includes the network slice identifier, multicast at a network slice granularity can be implemented, and a network slice-based multicast mechanism is implemented.

Figure 4:
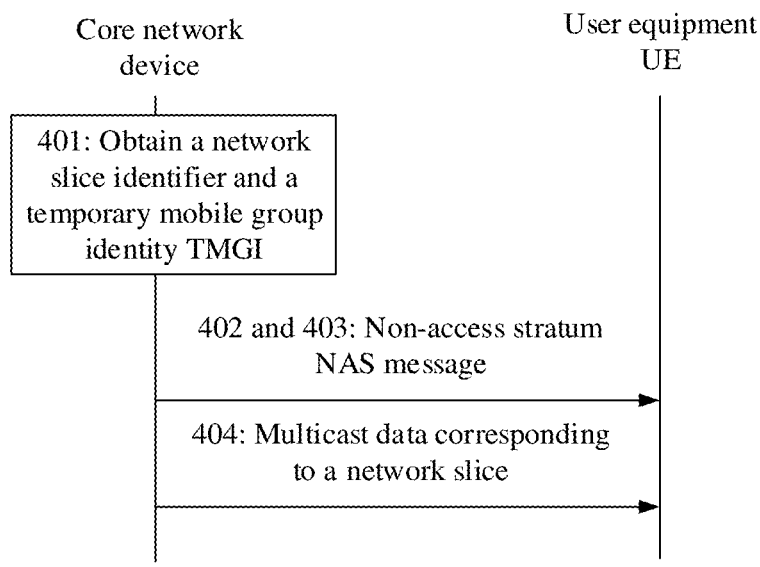
FIG. 4 is a schematic diagram of a network slice multicast procedure according to an embodiment of this application.

Manner 3:

First, refer to a multicast process of a network slice shown in FIG. 4. The process mainly includes that a core network device sends a NAS message to UE, where the NAS message includes a network slice identifier and a TMGI, and the network slice identifier corresponds to the TMGI. The process includes the following steps.

Step 401: A core network device obtains a network slice identifier and a TMGI, where the network slice identifier corresponds to the TMGI.

The TMGI corresponds to the network slice identifier. That is, the TMGI is the TMGI when the UE listens to multicast data of the interested network slice.

The core network device may further obtain an application identifier, where the application identifier corresponds to the network slice identifier.

For example, an application function (application function, AF) entity sends the network slice identifier and the TMGI to a policy control function (policy control function, PCF) entity in the core network device, where the network slice identifier corresponds to the TMGI. The PCF sends the corresponding network slice identifier and TMGI to an access and mobility management function (access and mobility management function, AMF) entity.

In this embodiment of this application, a manner in which the core network device obtains a mapping relationship between a network slice identifier and a TMGI is not limited. For example, the mapping relationship between a network slice identifier and a TMGI is included in a user route selection policy (UE route selection policy, URSP).

Step 402: The core network device sends a NAS message to the UE, where the NAS message includes a network slice identifier and a TMGI, and the network slice identifier corresponds to the TMGI.

For example, the AMF may further send the NAS message to the UE, where the NAS message includes the URSP.

A multicast mechanism on a base station side may remain unchanged, and a base station sends a fifth message to the UE, where the fifth message includes a TMGI and configuration information of a multicast traffic channel, and the TMGI corresponds to the multicast traffic channel.

Step 403: The UE receives the NAS message from the core network device.

The UE may further receive the fifth message sent by the base station, where the fifth message includes a TMGI and configuration information of a multicast traffic channel, and the TMGI corresponds to the multicast traffic channel.

Step 404: The UE receives, on a multicast traffic channel corresponding to the TMGI, the multicast data corresponding to the network slice.

For example, the UE determines a TMGI corresponding to an interested network slice, and then receives the multicast data corresponding to the network slice on a multicast traffic channel corresponding to the TMGI.

In the solution provided in the manner 3 in this embodiment of this application, the core network device sends the network slice identifier and the TMGI to the UE without changing an air interface, the TMGI corresponds to the network slice identifier, and the UE may further obtain the TMGI corresponding to the network slice identifier. In this way, the UE finally can receive, on the multicast traffic channel corresponding to the TMGI, the multicast data corresponding to the network slice, thereby implementing multicast at a network slice granularity, and implementing a network slice-based multicast mechanism.

Figure 5:
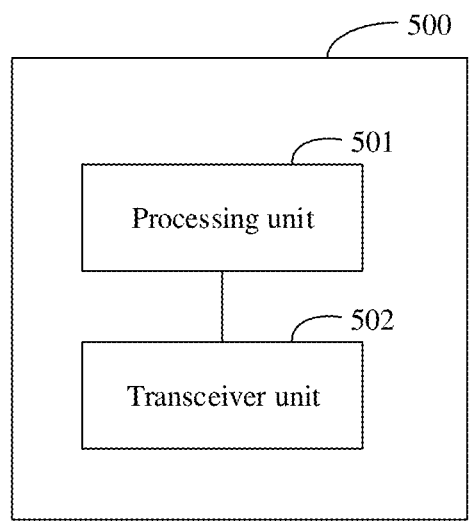
FIG. 5 is a schematic diagram of a structure of a network slice multicast apparatus according to an embodiment of this application.

The network slice multicast method in the embodiments of this application is described in detail with reference to FIG. 1 to FIG. 4. Based on a same inventive concept of the foregoing network slice multicast method, an embodiment of this application further provides a network slice multicast apparatus. As shown in FIG. 5, the network slice multicast apparatus 500 includes a processing unit 501 and a transceiver unit 502. The apparatus 500 may be configured to implement the methods described in the method embodiments applied to a core network device, UE, or an access network device.

In the case of the manner 1, in an embodiment, the apparatus 500 is applied to an access network device. The access network device may be an access network device or a DU in an access network device.

Specifically, the processing unit 501 is configured to generate a first message.

The transceiver unit 502 is configured to send the first message to user equipment UE, where the first message includes a network slice identifier and configuration information of a multicast traffic channel, and the network slice identifier corresponds to the multicast traffic channel.

In an implementation, the transceiver unit 502 is further configured to receive a network slice identifier and indication information from a core network device, where the indication information indicates multicast data corresponding to the network slice identifier.

In an implementation, the first message further includes a temporary mobile group identity TMGI, and the TMGI corresponds to the network slice identifier.

In an implementation, the configuration information of the multicast traffic channel includes at least one of the following information: a last subframe configuration, a data modulation and coding value, a scheduling period, a duration timer, a DRX inactivity timer, or a scheduling period start offset.

In an implementation, the transceiver unit 502 is further configured to send, on the multicast traffic channel, multicast data corresponding to a network slice.

In another embodiment, the apparatus 500 is applied to user equipment UE.

Specifically, the processing unit 501 is configured to receive the first message from the access network device by using the transceiver unit 502, where the first message includes a network slice identifier and configuration information of a multicast traffic channel, and the network slice identifier corresponds to the multicast traffic channel; and receive, on the multicast traffic channel, multicast data corresponding to a network slice.

In an implementation, the first message further includes a temporary mobile group identity TMGI, and the TMGI corresponds to the network slice identifier.

In an implementation, the configuration information of the multicast traffic channel includes at least one of the following information: a last subframe configuration, a data modulation and coding value, a scheduling period, a duration timer, a DRX inactivity timer, or a scheduling period start offset.

In the case of the manner 2, in an embodiment, the apparatus 500 is applied to an access network distributed unit DU.

Specifically, the processing unit 501 is configured to: receive, by using the transceiver unit 502, a multicast session establishment message sent by the access network centralized unit CU, where the multicast session establishment message includes a multicast session identifier; and send a second message to the user equipment UE, where the second message includes a multicast session identifier and configuration information of a multicast traffic channel, and the multicast session identifier corresponds to the multicast traffic channel.

In an implementation, the multicast session identifier includes at least one of the following information: a TMGI, a session identifier, or a network slice identifier.

In an implementation, the transceiver unit 502 is further configured to feed back one piece of downlink user plane tunnel endpoint information to the CU or feed back one group of downlink user plane tunnel endpoint information to the CU, where the group of downlink user plane tunnel endpoint information includes downlink user plane tunnel endpoint information corresponding to each multicast session.

In an implementation, the transceiver unit 502 is further configured to receive a third message from the CU, where the third message is used to indicate whether the DU feeds back one piece of downlink user plane tunnel endpoint information or one group of downlink user plane tunnel endpoint information.

In an implementation, the transceiver unit 502 is further configured to receive a fourth message from the CU, where the fourth message is used to indicate to start the multicast session, and the fourth message includes the multicast session identifier.

In an implementation, the transceiver unit 502 is further configured to receive data from the CU through a public user plane tunnel, where the data includes multicast data and the multicast session identifier.

In another embodiment, the apparatus 500 is applied to an access network centralized unit CU.

Specifically, the processing unit 501 is configured to generate a multicast session establishment message.

The transceiver unit 502 is configured to send a multicast session establishment message to an access network distributed unit DU, where the multicast session establishment message includes a multicast session identifier.

In an implementation, the multicast session identifier includes at least one of the following information: a TMGI, a session identifier, or a network slice identifier.

In an implementation, the transceiver unit 502 is further configured to receive one piece of downlink user plane tunnel endpoint information from the DU or receive one group of downlink user plane tunnel endpoint information from the DU, where the group of downlink user plane tunnel endpoint information includes downlink user plane tunnel endpoint information corresponding to a user plane tunnel of each multicast session.

In an implementation, the transceiver unit 502 is further configured to send a third message to the DU, where the third message is used to indicate whether the DU feeds back one piece of downlink user plane tunnel endpoint information or one group of downlink user plane tunnel endpoint information.

In an implementation, the transceiver unit 502 is further configured to send a fourth message to the DU, where the fourth message is used to indicate to start the multicast session, and the fourth message includes the multicast session identifier.

In an implementation, the transceiver unit 502 further sends data to the DU through a public user plane tunnel, where the data includes multicast data and the multicast session identifier.

In the case of the manner 2, in an embodiment, the apparatus 500 is applied to a core network device.

Specifically, the processing unit 501 is configured to obtain a network slice identifier and a temporary mobile group identity TMGI, where the network slice identifier corresponds to the TMGI.

The transceiver unit 502 is configured to send a non-access stratum NAS message to user equipment UE, where the NAS message includes a network slice identifier and TMGI, and the network slice identifier corresponds to the TMGI.

In an implementation, the processing unit 501 is further configured to obtain an application identifier, where the application identifier corresponds to the network slice identifier.

In an implementation, the NAS message further includes identification information of an application, and the application identifier corresponds to the network slice identifier.

In another embodiment, the apparatus 500 is applied to user equipment UE.

Specifically, the processing unit 501 is configured to: receive the NAS message from the core network device by using the transceiver unit 502, where the NAS message includes a network slice identifier and a temporary mobile group identity TMGI, and the network slice identifier corresponds to the TMGI; receive, on the multicast traffic channel corresponding to the TMGI, multicast data corresponding to a network slice.

In an implementation, the NAS message further includes identification information of an application, and the application identifier corresponds to the network slice identifier.

In an implementation, the transceiver unit 502 is further configured to receive a fifth message sent by a base station, where the fifth message includes a TMGI and configuration information of a multicast traffic channel, and the TMGI corresponds to the multicast traffic channel.

It should be noted that the module division in the embodiments of this application is an example, and is merely logical function division, and there may be other division manners in actual implementations. In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

Figure 6:
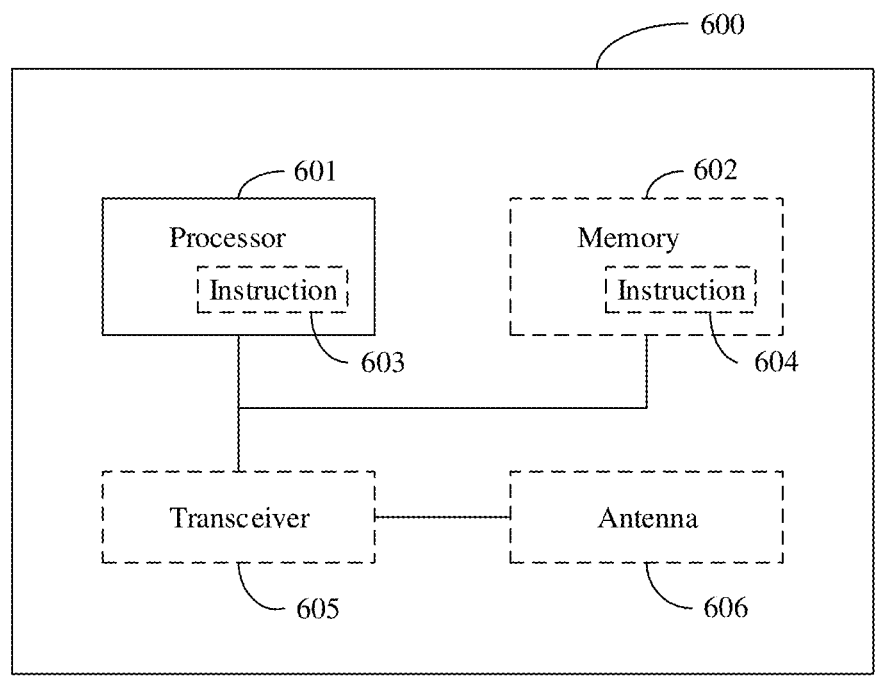
FIG. 6 is a schematic diagram of a structure of a network slice multicast apparatus according to an embodiment of this application.

Based on the same concept as the foregoing network slice multicast method, as shown in FIG. 6, an embodiment of this application further provides a schematic diagram of a structure of a network slice multicast apparatus 600. The apparatus 600 may be configured to implement the methods described in the method embodiments applied to an access network device, UE, or a core network device. For details, refer to the descriptions in the foregoing method embodiments. The apparatus 600 may be located in the access network device, the UE, or the core network device, or may be the access network device, the UE, or the core network device.

The apparatus 600 includes one or more processors 601, and the one or more processors 601 may implement the method performed by the access network device, the UE, or the core network device in the foregoing embodiments.

Optionally, the processor 601 may further implement another function in addition to the method in the foregoing embodiments.

Optionally, in a design, the processor 601 may execute instructions, so that the apparatus 600 performs the methods described in the foregoing method embodiments. All or a part of the instructions, for example, an instruction 603, may be stored in the processor; or all or a part of the instructions, for example, an instruction 604, may be stored in the memory 602 coupled to the processor. Alternatively, the apparatus 600 may be enabled, by using both the instructions 603 and 604, to perform the methods described in the foregoing method embodiments.

In another possible design, the communication apparatus 600 may further include a circuit. The circuit may implement the function of the access network device, the UE, or the core network device in the foregoing method embodiments.

In another possible design, the apparatus 600 may include one or more memories 602 storing instructions 604, and the instructions may be run on the processor, so that the apparatus 600 performs the method described in the foregoing method embodiments. Optionally, the memory may further store data. Optionally, the processor may also store instructions and/or data. For example, the one or more memories 602 may store a correspondence described in the foregoing embodiments, or a related parameter or table provided in the foregoing embodiments. The processor and the memory may be separately disposed, or may be integrated together.

In another possible design, the apparatus 600 may further include a transceiver 605 and an antenna 606. The processor 601 may be referred to as a processing unit, and controls an apparatus (a terminal or a base station). The transceiver 605 may be referred to as a transceiver, a transceiver circuit, a transceiver unit, or the like, and is configured to implement a transceiver function of the apparatus by using the antenna 606.

It should be noted that, the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

An embodiment of this application further provides a computer-readable medium, storing a computer program. When the computer program is executed by a computer, the network slice multicast method in any method embodiment applied to an access network device, UE, or a core network device is implemented.

An embodiment of this application further provides a computer program product. When the computer program product is executed by a computer, the network slice multicast method in any method embodiment applied to an access network device, UE, or a core network device is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions.

When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

An embodiment of this application further provides a processing apparatus, including a processor and an interface. The processor is configured to perform the network slice multicast method described in any method embodiment applied to an access network device, UE, or a core network device.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general-purpose processor, implemented by reading software code stored in a memory. The memory may be integrated into the processor, or may be located outside the processor and exist independently.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions in the embodiments in this application.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by using software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. A disk (Disk) and disc (disc) used by this application include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

An embodiment of this application further provides a computer-readable medium, storing a computer program. When the computer program is executed by a computer, the network slice multicast method in any method embodiment applied to an access network device, UE, or a core network device is implemented.

An embodiment of this application further provides a computer program product. When the computer program product is executed by a computer, the network slice multicast method in any method embodiment applied to an access network device, UE, or a core network device is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

An embodiment of this application further provides a processing apparatus, including a processor and an interface. The processor is configured to perform the network slice multicast method described in any method embodiment applied to an access network device, UE, or a core network device.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general-purpose processor, implemented by reading software code stored in a memory. The memory may be integrated into the processor, or may be located outside the processor and exist independently.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions in the embodiments in this application.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by using software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. A disk (Disk) and disc (disc) used by this application include a compact disc CD, a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A network slice multicast method, comprising:
   generating, by an access network device, a first message; and
   sending, by the access network device, the first message to a user equipment (UE), wherein the first message comprises a first network slice identifier and configuration information of a multicast traffic channel, and the first network slice identifier corresponds to the multicast traffic channel.

2. The method according to claim 1, further comprising:
   receiving, by the access network device, a second network slice identifier and indication information from a core network device, wherein the indication information indicates multicast data corresponding to the second network slice identifier.

3. The method according to claim 1, wherein the first message further comprises a temporary mobile group identity (TMGI), and the TMGI corresponds to the first network slice identifier.

4. The method according to claim 1, wherein the configuration information of the multicast traffic channel comprises at least one of:
   a last subframe configuration, a data modulation and coding value, a scheduling period, a logic channel identifier, a duration timer, a discontinuous reception (DRX) inactivity timer, or a scheduling period start offset.

5. The method according to claim 1, further comprising:
   sending, by the access network device on the multicast traffic channel, multicast data corresponding to a network slice.

6. A network slice multicast method, comprising:
   receiving, by a user equipment (UE), a first message from an access network device, wherein the first message comprises a network slice identifier and configuration information of a multicast traffic channel, and the network slice identifier corresponds to the multicast traffic channel; and
   receiving, by the UE on the multicast traffic channel, multicast data corresponding to a network slice.

7. The method according to claim 6, wherein the first message further comprises a temporary mobile group identity (TMGI), and the TMGI corresponds to the network slice identifier.

8. The method according to claim 6, wherein the configuration information of the multicast traffic channel comprises at least one of:
a last subframe configuration, a data modulation and coding value, a scheduling period, a logic channel identifier, a duration timer, a discontinuous reception (DRX) inactivity timer, or a scheduling period start offset.

9. The method according to claim 6, wherein the access network device is an access network distributed unit (DU).

10. A network slice multicast apparatus of an access network device, comprising a processor and a transceiver, wherein
the processor is configured to generate a first message; and
the transceiver is configured to send the first message to a user equipment (UE), wherein the first message comprises a first network slice identifier and configuration information of a multicast traffic channel, and the first network slice identifier corresponds to the multicast traffic channel.

11. The apparatus according to claim 10, wherein the transceiver is further configured to receive a second network slice identifier and indication information from a core network device, wherein the indication information indicates multicast data corresponding to the second network slice identifier.

12. The apparatus according to claim 10, wherein the first message further comprises a temporary mobile group identity (TMGI), and the TMGI corresponds to the first network slice identifier.

13. The method according to claim 10, wherein the configuration information of the multicast traffic channel comprises at least one of:
a last subframe configuration, a data modulation and coding value, a scheduling period, a logic channel identifier, a duration timer, a discontinuous reception (DRX) inactivity timer, or a scheduling period start offset.

14. The method according to claim 10, wherein the transceiver is further configured to send, on the multicast traffic channel, multicast data corresponding to a network slice.

15. A network slice multicast apparatus, comprising a processor and a transceiver, wherein
the processor is configured to:
receive a first message from the transceiver, wherein the first message comprises a network slice identifier and configuration information of a multicast traffic channel, and the network slice identifier corresponds to the multicast traffic channel; and
receive multicast data corresponding to a network slice from the transceiver; and
the transceiver is configured to:
receive the first message from an access network device; and
receive, on the multicast traffic channel, the multicast data corresponding to the network slice.

16. The apparatus according to claim 15, wherein the first message further comprises a temporary mobile group identity (TMGI), and the TMGI corresponds to the network slice identifier.

17. The apparatus according to claim 15, wherein the configuration information of the multicast traffic channel comprises at least one of:
a last subframe configuration, a data modulation and coding value, a scheduling period, a logic channel identifier, a duration timer, a discontinuous reception (DRX) inactivity timer, or a scheduling period start offset.

18. The apparatus according to claim 15, wherein the access network device is an access network distributed unit (DU).

* * * * *